March 18, 1930.    L. A. GRIMES    1,751,201
DRY PIPE VALVE
Filed June 25, 1925
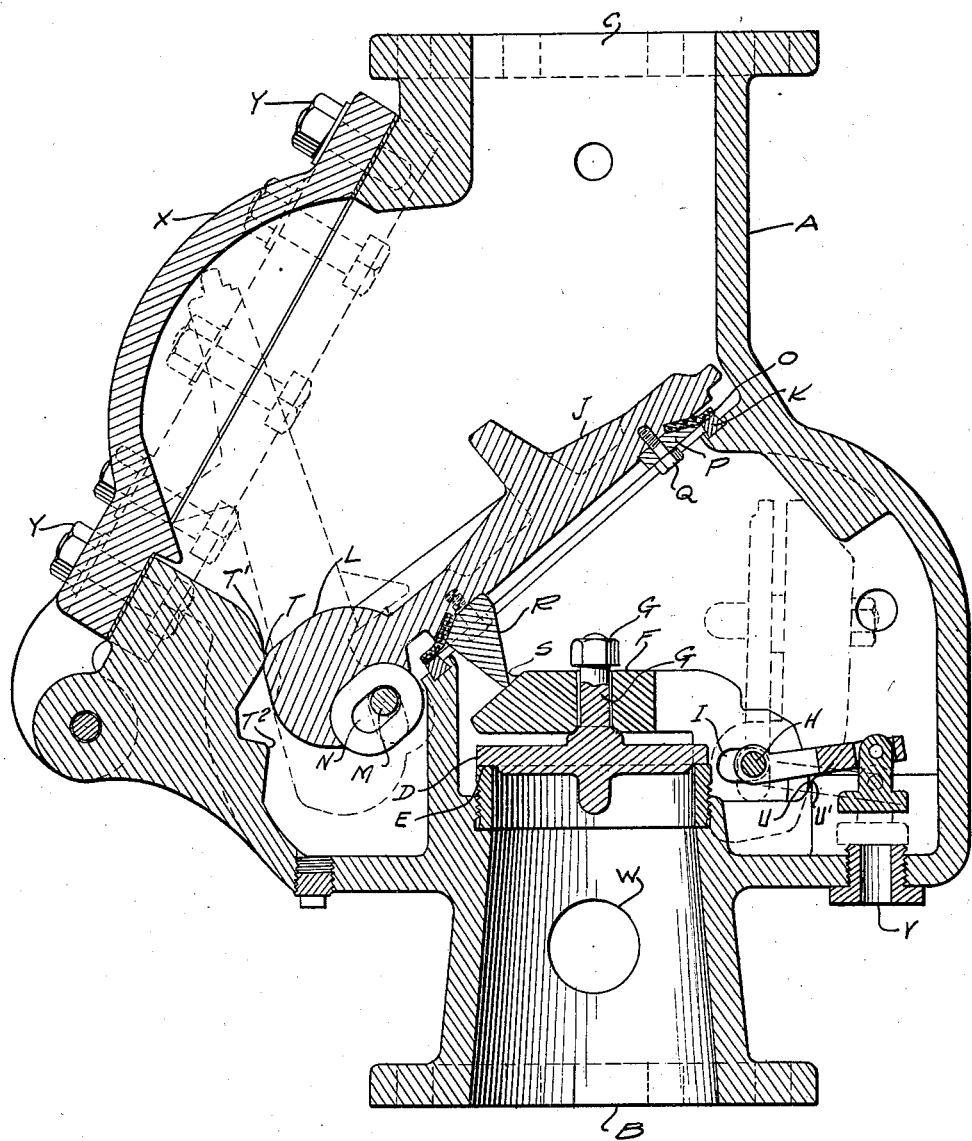
INVENTOR
Lester A. Grimes
BY
Ralph L. Scott
ATTORNEY Patented Mar. 18, 1930

1,751,201

UNITED STATES PATENT OFFICE

LESTER A. GRIMES, OF MONTCLAIR, NEW JERSEY, ASSIGNOR TO GRIMES SPRINKLER COMPANY, INC., OF NEWARK, NEW JERSEY, A CORPORATION OF NEW JERSEY

DRY-PIPE VALVE

Application filed June 25, 1925. Serial No. 39,433.

The present invention relates to dry pipe valves of the semi-mechanical differential type for automatic sprinkler systems wherein air under relatively low pressure is utilized to prevent water under relatively high pressure from entering the system until a fire occurs and opens one or more sprinkler heads.

The object of the invention is to provide a valve comprising a minimum number of parts and of the utmost simplicity in construction, with a corresponding reduction in both size and cost; and, at the same time, a valve which may be termed mechanically correct and hence positive and certain in action.

More specifically, one object of the invention is the provision of means whereby the opposing pressures of air and water may be effectively transmitted from one clapper to the other while insuring proper seating of each clapper, and proper opening movement of each upon reduction of the air pressure.

Another object is the elimination of separate parts, such as latches and dogs heretofore employed, to prevent reseating of either clapper after once opened a predetermined extent, and to provide in place thereof means whereby the clapper-arms themselves will operate to prevent reseating.

These objects and others incident thereto are accomplished as hereinafter set forth. The accompanying drawings are for the purpose of illustration, but it is to be expressly understood they are for that purpose only and are not meant to define the limits of the invention, reference being had to the appended claims for this purpose. The drawings show a vertical section of the device as a whole.

In the embodiment of the invention shown, the casing A is provided with the inlet B communicating with the water supply, and with the outlet C communicating with the sprinkler system. The inlet and outlet are preferably directly opposite each other and co-axial in order that a straight passage-way through the casing may be provided for the water. By the clappers hereinafter described, the interior of the casing is divided into the usual three chambers, namely, the inlet, the outlet, and the intermediate.

The inlet B is controlled by the water-clapper D, which clapper is provided with a seat such as the ring E suitably secured to the casing and positioned horizontally with respect to the inlet passage. This clapper is supported by the lever arm F through the intermediary of a threaded projection G, which projection extends upwardly from the center of the clapper, passes through an opening in the arm, and is secured in position by the nut G'. The projection is preferably somewhat less in horizontal cross-section than the diameter of the opening in the arm, and the nut G' is preferably not turned down to contact with the arm, in order to provide a lost motion connection, in the nature of a universal joint, so as to permit accurate seating of the clapper. The pivot H, carried by the casing, engages a slot I in one end of the arm F and provides an axis about which the water-clapper oscillates.

The air-clapper J is provided with a seat such as the ring K suitably secured to the casing. This seat is at an angle to the seat E, and positioned obliquely with respect to the axis of the water-way. The internal diameter of the air-clapper seat is sufficient to prevent restriction of the water-way, although the opening is in the form of an ellipse rather than round when viewed from the axis of the outlet, because of the oblique positioning with respect to said axis. The clapper itself is greater in area than the water-clapper in order to provide, in the well-known manner, one component of the differential essential to maintaining the water-clapper on its seat, the other component being mechanical means below described.

The clapper J is supported by the arm L, which arm may be made integral with or as an extension of the clapper. A pivot M, carried by the casing, engages a slot N in one end of the arm L and provides an axis around which the clapper oscillates. On its lower face the clapper is provided with a rubber gasket O, held in position as by the ring P and bolts Q, to insure a tight joint between the clapper and its seat.

Extending downwardly from the air-clapper is a projection or lug R, the lower end of which rests upon an inclined surface S, provided at the outer end of the water-clapper arm F, said surface being normally in a plane substantially parallel to that of the air-clapper. The projection R may be formed as part of the ring P, or made separately and secured to the lower face of the air-clapper in any desired manner. This projection is positioned intermediate the center of the air-clapper and its pivot M, and the contact thereof with the outer end of the arm F affords a mechanical leverage to complement the difference in area between the two clappers, and thus provides the differential whereby the water-clapper is maintained normally closed against relatively high water pressure by means of the air-clapper under the influence of relatively low air pressure. The arrangement of parts as here shown is for a differential in the ratio of approximately 6 to 1.

The pressure of water on the clapper D is in a line perpendicular to the plane of the clapper. Part of this water pressure is taken up by the pivot H, and the balance is exerted on the air-clapper through the medium of the projection R. The pressure of air on the clapper J is likewise in a line perpendicular to the plane of the clapper. A small part of this air pressure is taken up by the seat K and the pivot M, and the balance is exerted on the water-clapper through the medium of the projection R, to maintain the latter normally closed against the water pressure.

The pivoted end of the air-clapper arm L is extended to form a shoulder T. When the air-clapper is in its normal closed position this extension T abuts against the shoulder T', carried by the casing, and prevents the clapper from sliding downward in the plane of its seat. When in such closed position, the pivot M is in the portion of the slot N nearest the valve seat K.

The pivoted end of the water-clapper arm F is likewise extended to form a shoulder U; and when the water-clapper is in its normal closed position this extension U abuts against a shoulder U' on the casing, and prevents the water-clapper from being shifted in the plane of its seat toward the casing by the constant push of the air-clapper through the projection R on the inclined surface S. When in such closed position, the pivot H is in the portion of the slot I farthest removed from the valve seat E.

In operation, when one or more sprinkler heads open, air is released from the system, the valves become unbalanced, the water-clapper is raised from its seat by the greater water pressure, and the air-clapper is raised from its seat in like proportion because of the pressure thereon through the medium of the projection R. Continued opening movement of the clappers, due to the inrush of water from the main, causes them finally to assume the position shown in dotted lines.

To prevent the formation of water-column in the sprinkler system, and thereby impose upon the clapper J the pressure of such column and thus prevent operation, means are provided whereby neither clapper is permitted to reseat after once opened. When the clappers are opening, the initial movement of the air-clapper will be one of oscillation about its axis. Because of the engagement between the extension T on the clapper arm and the shoulder T' on the casing, opening of the clapper will be accompanied by an upward movement of translation in addition to the movement of oscillation, which combined movements will continue until said extension T has slipped by the shoulder T', whereupon the clapper will have a translatory movement in the opposite direction, induced by gravity, and said shoulder then being above the extension on the clapper-arm will act as a stop to prevent reseating. The pivot M is the main axis around which the clapper oscillates, but the shoulder T' is nevertheless effective as a fulcrum on which the lever arm L rests and about which it initially turns. By the manner of mounting the clapper on its pivot M, the lowermost portion of the slot N does not engage the pivot until the clapper has reached the uppermost limit of its lateral movement, thereby permitting the upward translatory movement.

In order to insure the above operation, the reaction of the water-clapper upon the air-clapper must be in such direction that the air-clapper is not shifted longitudinally away from the abutment T', or, on the other hand, that it is not wedged too firmly thereagainst, as in either case initial pivoting about the point T' would be impossible. It has been found by various tests that the proper operation depends to a great extent upon the slope of the surface S at the point of contact of the two clappers. The preferred slope of this surface in the structure illustrated is found to be substantially parallel to the plane of the air-clapper.

If desired, a second like shoulder T² may be provided; so that, upon further rotation, the air-clapper may be held in the more open position,—this shoulder T² co-operating in the same manner as the shoulder T' with the extension T. Still further rotation of the clapper will carry it beyond its center of gravity, with respect to the pivot M, and it will then fall back against the interior side wall of the casing, as shown in dotted lines.

The opening of the water-clapper is similar to that of the air-clapper in that combined movements of oscillation and translation are involved. Pivot H is the main axis around which the clapper oscillates, while at the same time the shoulder U' serves as a fulcrum on which the lever arm F rests and about which it initially turns. When the parts are in normal position, pivot H is in the outermost portion of slot I. During the opening movement the extension U slides downward on shoulder U' and the arm F likewise slides downward as a whole on its pivot; so that, when in full open position as shown in dotted lines, the pivot is in the other end of its slot and the projection U is below its shoulder U', the latter then acting as a stop to prevent reseating.

The flow through the opened sprinkler heads is discontinued by the usual valve located between the inlet B and the source of supply. Water then left in the system is carried off through the usual drain W, normally closed and controlled by a suitable valve. Access to the interior of the casing is then gained by removal of the plate X, secured in position as by the bolts Y, and the clappers manually restored to seated position. Following this restoration, the proper pressure of air is introduced into the system, the valve in the main opened, and the device made ready for future use.

Having thus described the invention, the following is claimed:

1. A dry pipe valve comprising a casing, an air-clapper and a water-clapper therein, means for transmitting pressure from one to the other when seated, projections carried by the casing, and independent supporting means for each clapper each adapted to co-act with one of said projections to impart to the clapper upon opening a combined motion of rotation and of translation in a plane approximately parallel to that of the clapper, the said projections and supporting means being relatively so arranged that the supporting means will fall by gravity past the projections as the clappers move to the full open position.

2. A dry pipe valve comprising a casing, an air-clapper and a water-clapper therein, means for transmitting pressure from one to the other when seated, projections carried by the casing, and independent supporting means for each of said clappers arranged to coact with said projections to have combined movement of rotation and translation to open the waterway and a further movement induced by gravity whereby the clappers are prevented from reseating.

3. In a dry pipe valve, a casing having an inlet and an outlet opening, an air-clapper and a water-clapper therein arranged to transmit pressure from one to the other when seated, an independent support for each of said clappers, a slot in the outer end of each support, said slot extending in a plane approximately parallel to that of its clapper, pivots carried by said casing engaging the respective slots and around which said clappers respectively oscillate, and shoulders carried by said casing positioned to engage and hold said clapper supports when the clappers are seated and to release said supports for movement of the clappers in their respective planes when they approach the open position.

4. A dry pipe valve comprising a casing having an inlet-chamber, an outlet-chamber, and an intermediate-chamber provided with an air-seat and a water-seat, in combination with a clapper for each of said seats, fixed projections carried by said casing, and supporting means for each of said clappers adapted to co-act with said projections for an initial rotation about the latter and to prevent reseating of the clapper after opening a predetermined extent, each supporting means being mounted in the casing independently of said projections in such manner as to permit said initial rotation.

5. In a device for automatic sprinkler systems, a casing having an inlet and an outlet opening, a clapper in said casing, and supporting means for said clapper adapted to impart thereto a simultaneous and combined movement of rotation and of translation in a plane substantially parallel to that of the clapper to change the position of the clapper and to prevent its return to normal position.

6. In a dry pipe valve, a casing having two valve seats arranged therein at an acute angle to each other, independently mounted upper and lower valves therefor, a supporting structure for the upper valve having a part of its surface so shaped as to bear against a projection carried by the casing when the upper valve is seated, said supporting structure being provided with a slot extending substantially in the plane of the upper valve seat and adapted to receive a hinge pin therethrough, and a surface on the supporting structure of the lower valve adapted to be engaged by a member carried by the upper valve when seated, the slope of said surface at the point of engagement being such as to insure initial pivoting of the upper valve about the point of contact of its supporting structure with the projection on the casing, the said projections and supporting means being relatively so arranged that the supporting means will fall by gravity past the projections as the clappers move to the full open position.

7. The combination according to claim 6 wherein the slope of said surface on the supporting structure of the lower valve is substantially parallel to the plane of the upper valve seat.

8. In a dry pipe valve, a casing having two valve seats arranged therein at an acute angle to each other, independently mounted upper and lower valves therefor, a supporting structure for each valve, two projections carried by said casing each adapted to engage one of said supporting structures when the valves are seated, hinge pins carried by the casing each so connected with one of said structures as to permit definite longitudinal movement of the associated valve, a member carried by the upper valve adapted when the valves are seated to engage a surface of the supporting structure of the lower valve to transmit pressure therebetween, the engaging surface of the supporting structure of the lower valve being at such an angle as to insure initial pivoting of said upper valve about the point of engagement of the supporting structure therefor with the associated projection on the casing rather than about its associated hinge pin, the said projections and supporting means being relatively so arranged that the supporting means will fall by gravity past the projections as the clappers move to the full open position.

9. The combination according to claim 8 wherein said engaging surface of the supporting structure of the lower valve is in a plane substantially parallel to the upper valve seat.

In testimony whereof, I have signed my name to this specification.

LESTER A. GRIMES.